(12) United States Patent
Calvento

(10) Patent No.: US 6,298,771 B1
(45) Date of Patent: Oct. 9, 2001

(54) DISPOSABLE COFFEE BREWING UNIT FOR INDIVIDUAL SERVINGS

(76) Inventor: John Perez Calvento, 530 S. Normandie Ave. #2, Los Angeles, CA (US) 90020

( * ) Notice: Subject to any disclaimer, the term of this patent is extended or adjusted under 35 U.S.C. 154(b) by 0 days.

(21) Appl. No.: 09/565,052

(22) Filed: May 5, 2000

(51) Int. Cl.[7] .................................................. A47J 31/02
(52) U.S. Cl. .............................. 99/323; 99/306; 99/316; 99/317
(58) Field of Search ............................ 99/306, 304, 317, 99/318, 319, 316, 323; 220/380, 712, 713, 718, 716

(56) References Cited

U.S. PATENT DOCUMENTS

| 1,499,281 | * | 6/1924 | Altieri | 99/306 |
| 2,899,310 | * | 8/1959 | Dale | 99/306 X |
| 4,027,582 | * | 6/1977 | O'Connell | 99/306 |
| 4,303,525 |   | 12/1981 | Stover | 210/455 |
| 4,520,716 | * | 6/1985 | Hayes | 99/306 |
| 4,715,271 |   | 12/1987 | Kitagawa | 99/306 |
| 4,765,896 |   | 8/1988 | Hartley | 210/474 |
| 5,055,311 |   | 10/1991 | Brauer, Jr. | 426/82 |
| 5,424,083 |   | 6/1995 | Lozito | 426/82 |
| 5,503,289 | * | 4/1996 | Fox | 220/713 X |
| 5,605,710 |   | 2/1997 | Pridonoff | 466/86 |
| 6,056,145 |   | 5/2000 | Rush et al. | 220/297 |
| 6,095,033 | * | 8/2000 | Melton | 99/323 X |

* cited by examiner

Primary Examiner—Reginald L. Alexander

(57) ABSTRACT

A disposable drip-type coffee brewing unit for making individual servings of freshly brewed coffee. The coffee brewing unit consists of a disposable beverage receptacle, a disposable brewing cup, a receptacle cover that is also used as the brewing cup holder, and a lid for the receptacle cover

1 Claim, 6 Drawing Sheets

FIG. 2
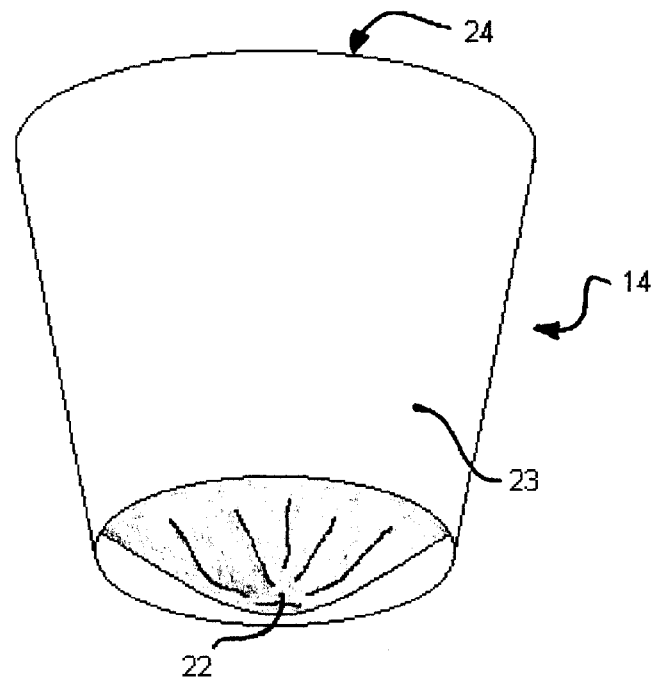
FIG. 2A
FIG. 3
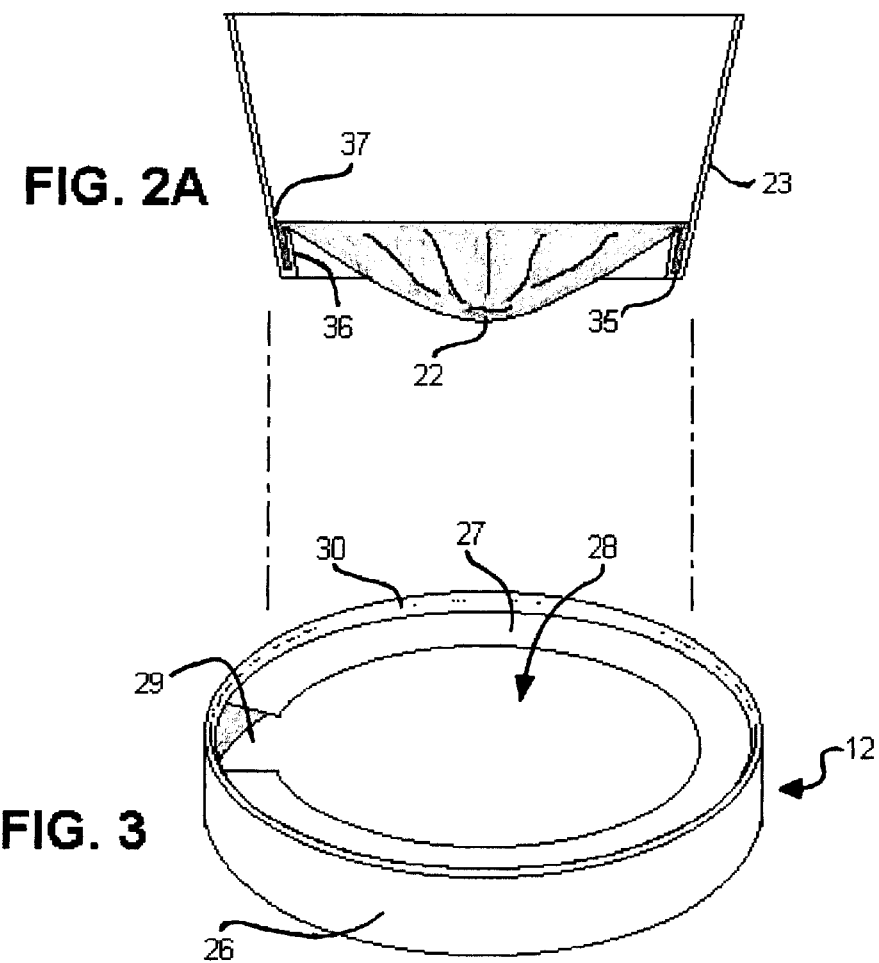

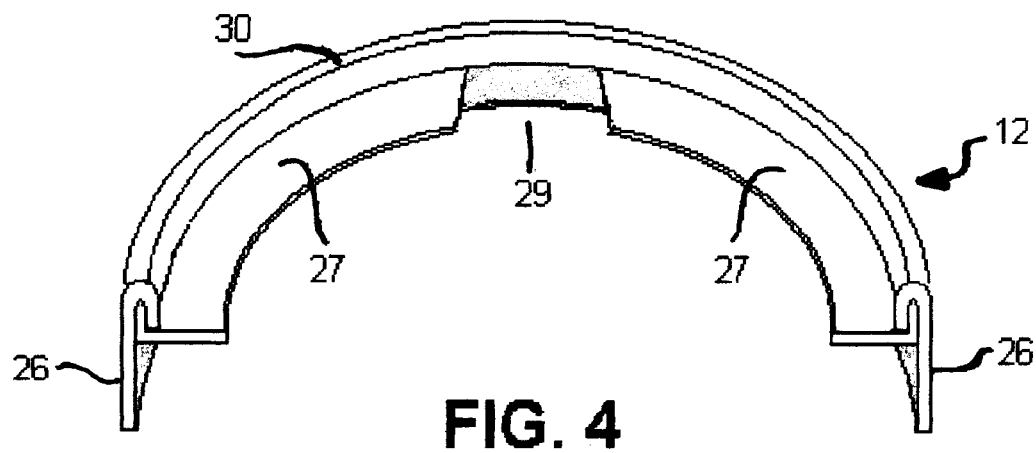
FIG. 4
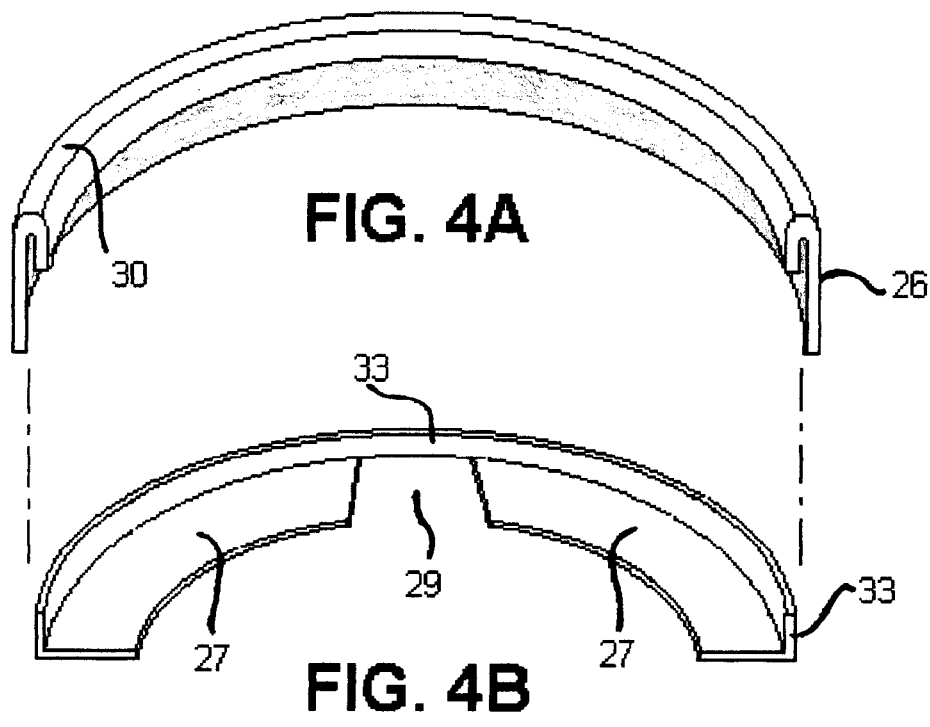
FIG. 4A
FIG. 4B

DISPOSABLE COFFEE BREWING UNIT FOR INDIVIDUAL SERVINGS

CROSS-REFERENCES TO RELATED APPLICATIONS

U.S. Patent Documents:

| | | | |
|---|---|---|---|
| 1,499,281 | 6/1942 | Altieri | 99/306 |
| 2,899,310 | 8/1959 | Dale | 99/306 X |
| 4,027,582 | 6/1977 | O'Connell | 99/306 |
| 4,303,525 | 9/1979 | Stover | 210/455 |
| 4,520,716 | 6/1985 | Hayes | 99/306 |
| 4,715,271 | 7/1986 | Kitagawa | 99/306 |
| 4,765,896 | 5/1986 | Hartley | 210/474 |
| 5,055,311 | 11/1989 | Brauer | 426/82 |
| 5,424,083 | 10/1994 | Lozito | 426/82 |
| 5,503,289 | 4/1996 | Fox | 220/713 X |
| 5,605,710 | 6/1994 | Pridonoff | 466/86 |
| 6,056,145 | 5/2000 | Rush et al. | 220/297 |
| 6,095,033 | 8/2000 | Melton | 99/323 X |

STATEMENT REGARDING FEDERALLY SPONSORED RESEARCH AND DEVELOPMENT

Not Applicable.

REFERENCE TO A "MICROFICHE APPENDIX"

Not Applicable.

BACKGROUND OF THE INVENTION

1. Field of the Invention

The present invention relates to a disposable coffee brewing unit, containing all the necessary apparatus for the making of a freshly brewed individual serving of coffee.

2. Description of the Related Art

A common method of brewing coffee are by way of percolation and of drip. Restaurants and coffee shops commonly serve their customers with ready made coffee that have been brewed in coffee pots or in coffee brewing machines. A problem with this method is that the coffee that have been brewed in large amounts are not all served right away. A significant amount of coffee that have been brewed in large amounts are usually served at least half an hour after brewing. It is well known that coffee begins to deteriorate at least 20 minutes after it has been brewed. Brewed coffee that sits for more than 20 minutes should be considered stale. One way to solve this problem is to keep brewing a new batch of coffee every 20 minutes, but this could get very tiresome, wasteful, and costly.

There have been several other approaches used to try and solve the problem of staleness. One method used by The Procter & Gamble Co. is by packaging the coffee grinds inside tea bags called Coffee Singles. The idea is to brew coffee individually through single servings of a predetermined amount of coffee grinds in tea bags. Another method used by the Van Houtte Gourmet Coffee Co. is with the use of a machine that dispenses individual servings of brewed coffee. The idea here is to brew and serve coffee in the freshest way possible which is individual servings brewed only at the time a customer makes an order. If at all possible, it is even better if the coffee is brewed right in front of the customer so that there is no doubt as to the freshness of the beverage. It is no secret that coffee roasters know that freshness sells.

There are also other ideas, or inventions, that have been created to try and solve the problem of staleness in brewed coffee. Most of them are geared towards individual servings of brewed coffee. Inventions such as:

U.S. Pat. No. 1,499,281 (Altieri) titled "Individual Beverage Percolator". The invention is a device for producing beverages, particularly coffee, by percolation. The device is placed on top of a beverage container.

U.S. Pat. No. 2,899,310 (Dale) titled "Beverage Charge Holder". The invention is a beverage brewing device that is placed on top of a beverage container and is disposable.

U.S. Pat. No. 4,027,582 (O'Connell) titled "Art of Brewing Individual Servings of Coffee in a Cup". The invention is a drip coffee maker for brewing individual servings of coffee.

U.S. Pat No. 4,520,716 (Hayes) titled "Drip-type Coffee Making Apparatus". The invention, which is very similar to the invention mentioned above (O° Connel), is also for individual servings of brewed coffee.

U.S. Pat. No. 6,095,033 (Melton) fitled "Lid for Beverage Container". The invention is described as an infuser unit for making beverages in an associated container. The device functions both as a lid and an infuser unit It is primarily used for the individual brewing of loose tea, but it can also be used for the individual brewing of coffee.

BRIEF SUMMARY OF THE INVENTION

The main object of the present invention, which is very similar to each of the apparatus of the disclosures above, is the individual serving of freshly brewed coffee. The present invention is a unit that includes a brewing cup similar to that of Dale's "Beverage Charge Holder"; a holder for the brewing cup that also function as a partially open top beverage receptacle cover with lid; and a beverage receptacle.

A difference in the present invention from the disclosures above, as well as from other apparatus generally known in the art, is in the packaging. The brewing cup is designed so that it can be stored inside the accompanying beverage receptacle that is covered with the brewing cup holder and lid. Other ingredients for making a freshly brewed serving of coffee, such as a portion of vacuum sealed coffee grinds, sugar, cream, stirrer, and even snacks (cookie) can also be stored, with the brewing cup, inside the covered beverage receptacle. It is an all in one idea, and the only thing needed is hot water. The units can be sold by the case, or six pack. All the user have to do is grab one, or several, and brew coffee wherever hot water is available or can be made. This concept not only solves the problem of staleness but also answers the question of how clean and safe your coffee is. If it's brewing in front of you, then you know for sure. it's clean, safe, and it doesn't get any fresher than this.

Another difference in the present invention from the disclosures above as well as from others generally known in the art, is in the holder of the brewing cup that also function as the beverage receptacle cover with lid designed to minimize spills. This particular device of the unit is different, because its design and functions are novel. In contrast with Milton's "Lid for Beverage Container", his invention is a one piece unit that includes a built in well that cannot be removed. Also in contrast with U.S. Pat. No. 5,503,289 (Fox) titled "Beverage Container Lid Having a Retainably Opened Access Flap", Foxe's invention only acts as a lid with a flap used primarily to access the contents of the container its mounted to. The function of my invention is not only as a beverage receptacle cover with lid designed to minimize spills, but also as the brewing cup holder. It is also apparent that the designs are not the same.

In accordance with the present invention a disposable coffee brewing unit comprises a brewing cup, a holder for the brewing cup that also function as a beverage receptacle cover with lid, and a beverage receptacle.

BRIEF DESCRIPTION OF THE SEVERAL VIEWS OF THE DRAWINGS

FIG. 2 is a perspective view of the brewing cup, showing the bottom portion of the brewing cup that is covered with a sheet of filter.

FIG. 2A is a fragmentary perspective view of the bottom portion of the brewing cup, showing how the sheet of filter is attached to the inner bottom sides of the brewing cup.

FIG. 3 is a perspective view of the brewing cup holder and beverage receptacle cover, showing it in exploded relation to the brewing cup.

FIG. 4 is a fragmentary perspective view of one form of the brewing cup holder and beverage receptacle cover.

FIG. 4A and FIG. 4B is a fragmentary exploded view of FIG. 4.

DESCRIPTION OF THE PREFERRED EMBODIMENT OF THE INVENTION

Figure 1:
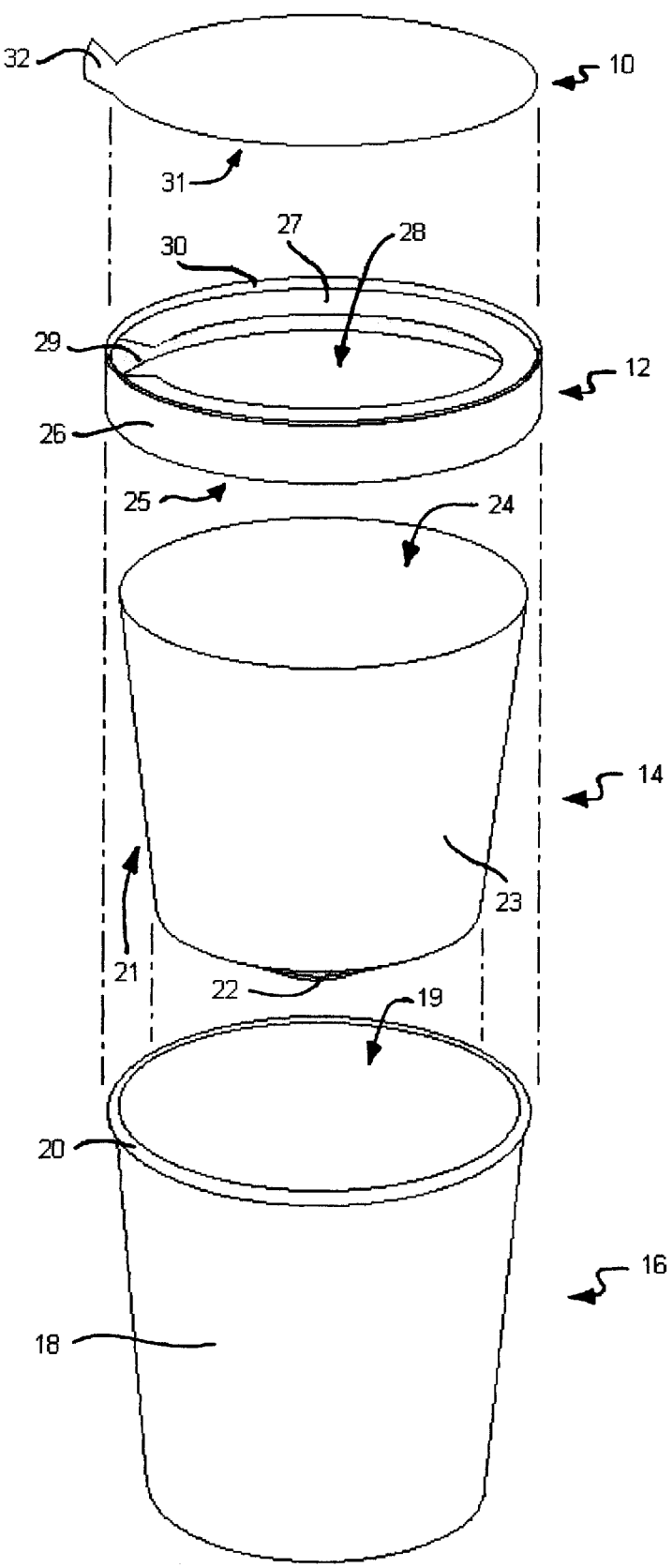
FIG. 1 is a perspective view of the invention, showing the beverage receptacle, the brewing cup, the brewing cup holder and beverage receptacle cover, and the beverage receptacle cover's lid.

While it will be understood that the invention may be embodied in somewhat different forms and that different materials may be used in the manufacture of the preferred forms of the product, a description will be given of several embodiments of the present invention. In at least one such embodiment, a removable disposable brewing cup and a brewing cup holder, that is also a beverage receptacle cover with lid, comes with a disposable beverage receptacle of moderate capacity, and wherein most or all of the invention is made from a coated paper material.

Referring now to the drawings in greater detail, FIGS. 1–8 show a low cost disposable brewing cup generally designated 14, a brewing cup holder and beverage receptacle cover generally designated 12, and a disposable lid generally designated 10, of the invention to be removably associated with a beverage receptacle or a disposable cup generally designated 16 for liquid beverages. The beverage receptacle 16 includes rounded sidewall portions 18, and an open top generally designated 19 defined in part by a rim 20, preferably in the form of a roll or curl formed in the top edge of the receptacle 16. In one preferred embodiment, the beverage receptacle is made from a coated paper material.

The brewing cup 14 is shown to comprise a one-piece body generally designated 21 having a frust-conical shape, widening upwardly, including rounded sidewall portions 23, an open top generally designated 24, and a bottom portion to which a filter sheet generally designated 22 is permanently secured to the inner bottom sidewall portions generally designated 37 of the brewing cup 14, as shown in FIGS. 2 and 2A, creating a charge holding space. To secure the filter sheet 22 to the inner bottom sidewall 37 of brewing cup 14, an inward fold generally designated 35, FIG. 2A, is made at the bottom to which the sides of the filter sheet 22 is pinned between the folded flaps generally designated 36 and the inner sidewall 37. A non toxic, odorless and tasteless, water resistant glue can be used to permanently secure the sides of the filter sheet 22, and the folded flaps 36, to the inner bottom sidewalls 37 of brewing cup 14. The filter sheet 22 should be large enough as to form a hollow or sunken space for holding a charge, such as coffee grinds, and where liquid, such as heated water, may be passed downwardly through the charge where a brewing action may occur, and through the filter sheet 22 downwardly into the beverage receptacle 16. Because of the disposable construction of the brewing cup 14, upon completion of the brewing operation the entire brewing cup and spent charge contained therein may be thrown away.

The brewing cup holder 12 is shown to comprise a one-piece body generally designated 25, including rounded sidewalls generally designated 26 that is folded inwards at the top creating a rim generally designated 30. The brewing cup holder 12 also includes an annular panel generally designated 27, in this case comprised of a strip that is attached to the inner sides of the upper part of the holder 12, also shown in FIGS. 3–6. The panel 27, which varies in width but preferably ¼ inch, partly goes around the inner circumference of the holder 12, leaving a space generally designated 29 for drinking, and the panel 27 also creates a circular opening generally designated 28 large enough to fit the outer circumference of the bottom part of the brewing cup 14, shown in FIGS. 3 and 8, and hold it securely in place. Another purpose of the panel 27 is to minimize spillage of the beverage being consumed.

The brewing cup holder 12 comes with a detachable lid 10 that seats on top of the holder 12. The lid 10 has a circular form generally designated 31 having a diameter that is slightly smaller than the inner circumference of the top of holder 12, so that the lid 10 can securely fit, and easily be removed from, the top of holder 12. In one corner, the lid 10 also includes a tab generally designated 32, FIG. 1, for easy insertion or removal on top of holder 12. The lid 10 is used, to further minimize spillage, after brewing is completed and the disposable brewing cup 14 is discarded.

As shown in the embodiment of FIGS. 4–4B, one way of making the holder 12 is to simply insert the folded sides of panel 27 generally designated 33, FIG. 4B, into or in between the space or groove created by the fold of the sidewall 26 beneath the rim 30, FIG. 4A.

Figure 5:
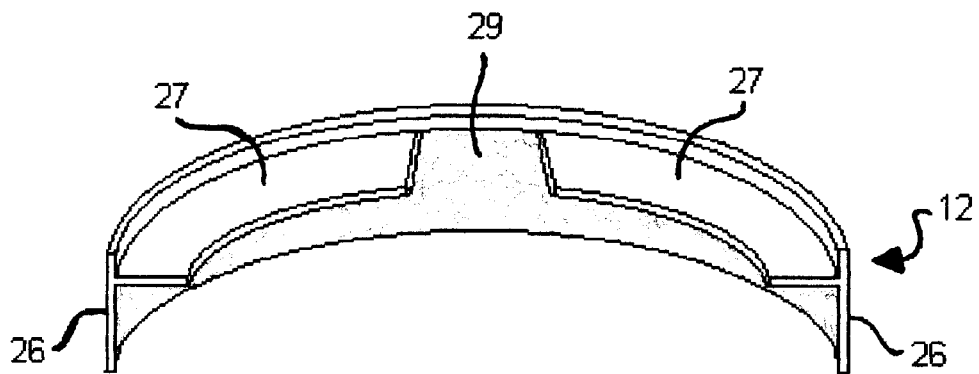
FIG. 5 is a fragmentary perspective view of an embodiment of a different form of the brewing cup holder and beverage receptacle cover.
Figure 6:
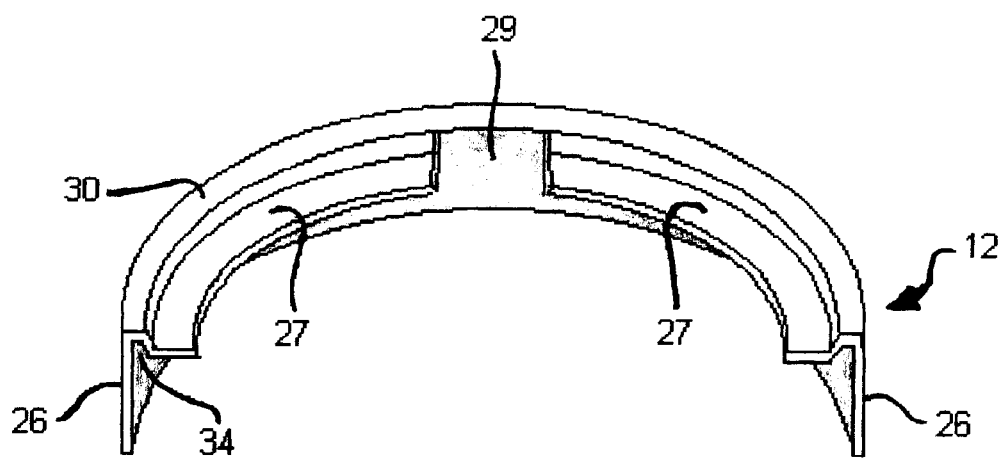
FIG. 6 is a fragmentary perspective view of an embodiment of another form of the brewing cup holder.

Referring now to FIGS. 5 and 6, several alternate forms of the holder 12 are shown. Referring first to FIG. 5, the holder 12 is shown to be similar to its counterpart in FIG. 4. The principal difference in the embodiment of FIG. 5 and that of FIG. 4 is in the way the panel 27, of FIG. 5, is attached to the inner part of sidewalls 26. FIG. 5 shows the panel 27 and the inner part of sidewalls 26 are fused together in one piece.

FIG. 6 shows another modified embodiment of the holder 12, and is also shown to be similar to its counterparts in FIGS. 4 and 5. Here the illustrated form of the holder 12 is produced by molding it into shape, or by inwardly folding the upper part of sidewalls 26 creating the rim 30 and an inner groove generally designated 34, and the annular panel 27 is vertically molded into place with another fold.

Figure 7:
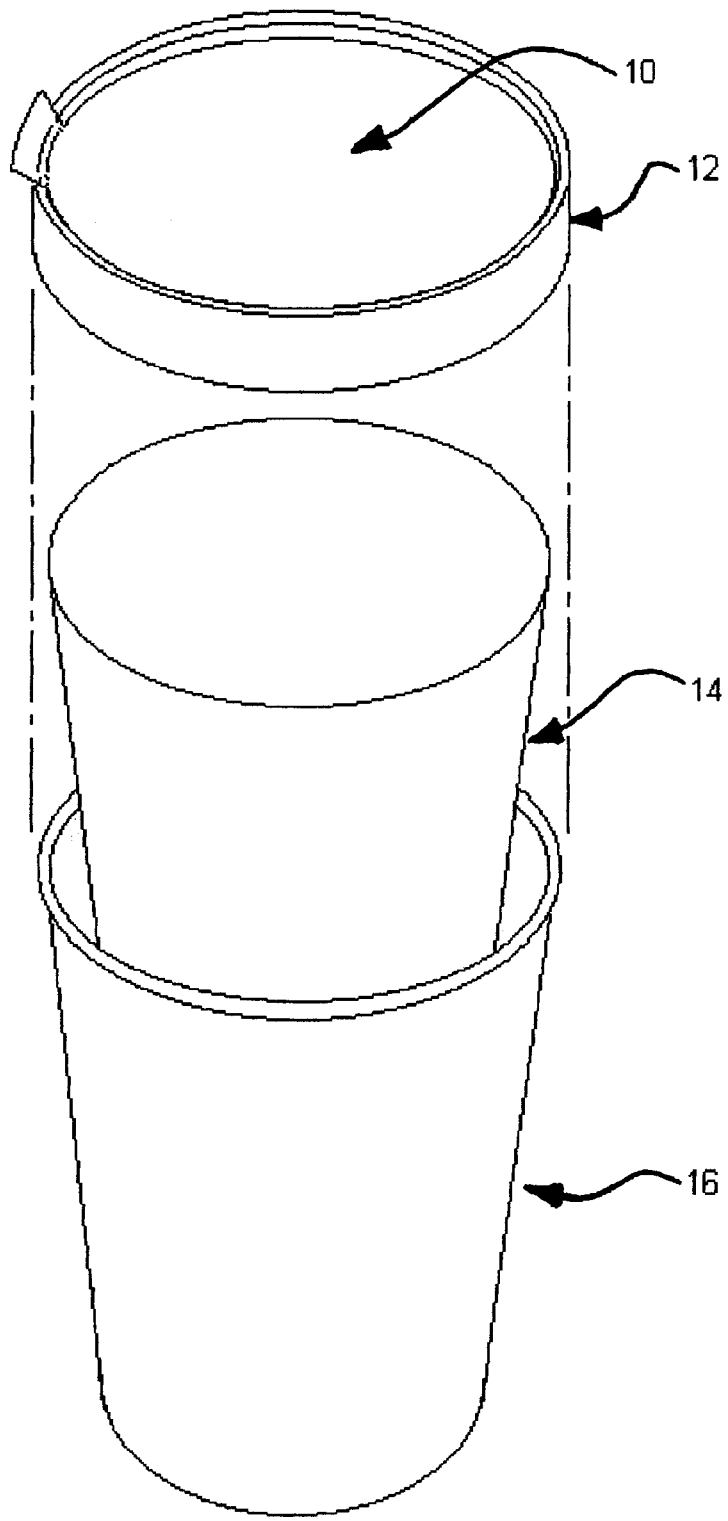
FIG. 7 is a perspective exploded view of the invention, showing how the unit is packaged, wherein the brewing cup fits and is packed inside the beverage receptacle, and the cover with lid is secured on top of the beverage receptacle.

Referring now to FIG. 7, an illustration showing how the invention is packaged, wherein the brewing cup 14 fits and is packed inside the beverage receptacle 16, and the brewing cup holder 12 with the lid 10 is used as a cover and is secured on top of the beverage receptacle 16.

Figure 8:
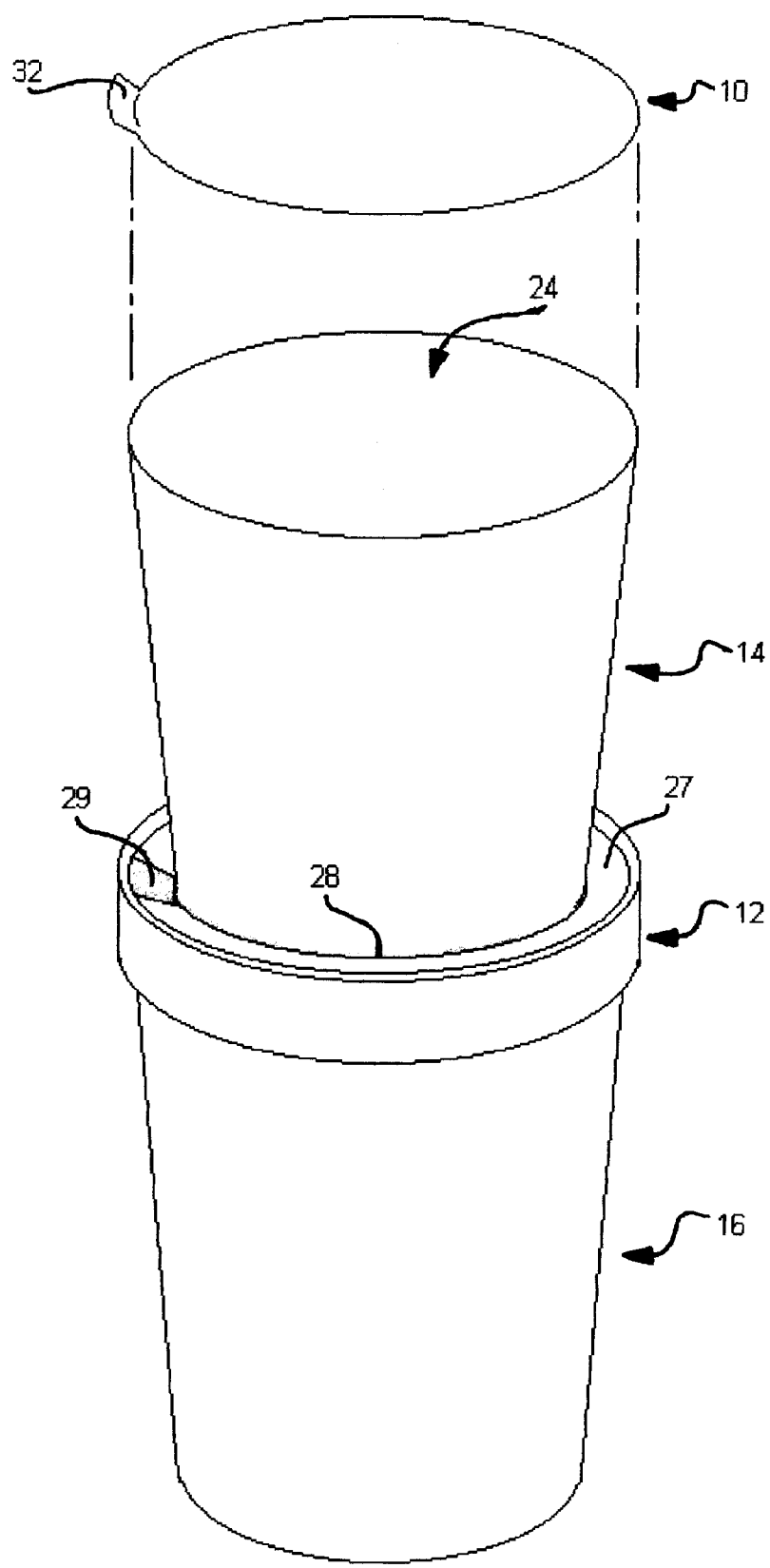
FIG. 8 is a perspective view of the invention, showing how the unit is assembled when brewing a serving of coffee.

FIG. 8 shows an illustration of how the invention is assembled when in use, or when coffee is being brewed. The brewing cup holder 12 is secured on top of the beverage receptacle 16, and the brewing cup 14 is securely seated onto the circular opening 28 created by the annular panel 27 of the holder 12. The lid 10 can be temporarily placed on top of the brewing cup 14 while brewing is occurring.

Each of the component of my coffee brewing unit is formed of disposable material such as paper, cloth, plastics, expanded polystyrene, aluminum, or otherwise any material being adapted to be disposed of economically.

While, for purposes of illustrating the invention, I described the components as having a rounded, circular, or conical form, it should be understood that the form of the components of the invention can be of different shapes other than circular or cylindrical.

While I have shown and described certain embodiments of my invention, it is to be understood that it is capable of many modifications. Changes, therefore, in the construction and arrangement may be made without departing from the spirit and scope of the invention as defined in the appended claims.

I claim:

1. A disposable drip-type coffee brewing unit comprising:

a beverage receptacle of moderate size with a curled rim;

a brewing cup having an open top and an inner bottom portion covered with a sheet of filter paper for holding a charge of coffee brewing material;

a cover for said beverage receptacle with means for securely holding said brewing cup, said cover having an opening therein;

and a detachable lid with a tab that securely seats on top of said cover and said opening; wherein said brewing cup is placed on said cover over said opening to allow extraction of the coffee brewing material.

* * * * *